United States Patent
Lewis et al.

(10) Patent No.: US 10,946,588 B2
(45) Date of Patent: Mar. 16, 2021

(54) SYSTEMS AND METHODS FOR AUTOMATED NOZZLE DESIGN AND 3D PRINTING

(71) Applicant: President and Fellows of Harvard College, Cambridge, MA (US)

(72) Inventors: Jennifer A. Lewis, Cambridge, MA (US); Mark Andrew Skylar-Scott, Brookline, MA (US); Jochen Mueller, Cambridge, MA (US); David Kolesky, Cambridge, MA (US)

(73) Assignee: President and Fellows of Harvard University, Cambridge, MA (US)

( * ) Notice: Subject to any disclaimer, the term of this patent is extended or adjusted under 35 U.S.C. 154(b) by 0 days.

(21) Appl. No.: 16/081,812

(22) PCT Filed: Mar. 3, 2017

(86) PCT No.: PCT/US2017/020759
§ 371 (c)(1),
(2) Date: Aug. 31, 2018

(87) PCT Pub. No.: WO2017/152109
PCT Pub. Date: Sep. 8, 2017

(65) Prior Publication Data
US 2019/0070786 A1 Mar. 7, 2019

Related U.S. Application Data

(60) Provisional application No. 62/303,800, filed on Mar. 4, 2016.

(51) Int. Cl.
*B29C 64/393* (2017.01)
*G05B 19/4099* (2006.01)
(Continued)

(52) U.S. Cl.
CPC .......... *B29C 64/393* (2017.08); *B29C 64/112* (2017.08); *B29C 64/118* (2017.08);
(Continued)

(58) Field of Classification Search
CPC .................................................. B29C 67/0059
(Continued)

(56) References Cited

U.S. PATENT DOCUMENTS

| 2004/0051720 A1 | 3/2004 | Hall et al. |
| 2005/0154481 A1 | 7/2005 | Berger et al. |

(Continued)

FOREIGN PATENT DOCUMENTS

| WO | WO 2014/209994 A2 | 12/2014 |
| WO | WO 2015/077262 A1 | 5/2015 |
| WO | WO 2015/107333 A1 | 7/2015 |

OTHER PUBLICATIONS

International Search Report and Written Opinion dated Jun. 29, 2017 for PCT Application No. PCT/US2017/020759 (10 pp.).

*Primary Examiner* — Suresh Suryawanshi
(74) *Attorney, Agent, or Firm* — Brinks Gilson & Lione

(57) ABSTRACT

A present disclosure relates to a system for automatic design and manufacturing of 3D printing units and 3D products. The system is configured to obtain specification of a target structure corresponding to a 3D product; automatically determine a design and a printing path of a 3D printing unit based on the specification of the target structure, wherein the 3D printing unit is a micronozzle unit configured to print the target structure of the 3D product; automatically determine a manufacturing procedure to print the 3D printing unit based on the specification of the target structure; and instruct a 3D printer to print the 3D printing unit according to the manufacturing procedure and the printing path of the 3D printing unit.

20 Claims, 7 Drawing Sheets

(51) Int. Cl.

| | | |
|---|---|---|
| *B33Y 30/00* | (2015.01) | |
| *B29C 64/209* | (2017.01) | |
| *B29C 67/00* | (2017.01) | |
| *B29C 64/112* | (2017.01) | |
| *G06F 30/00* | (2020.01) | |
| *B29C 64/118* | (2017.01) | |
| *G06F 119/18* | (2020.01) | |
| *B33Y 10/00* | (2015.01) | |
| *B33Y 50/02* | (2015.01) | |

(52) U.S. Cl.
CPC ............ *B29C 64/209* (2017.08); *B29C 67/00* (2013.01); *B33Y 30/00* (2014.12); *G05B 19/4099* (2013.01); *G06F 30/00* (2020.01); *B33Y 10/00* (2014.12); *B33Y 50/02* (2014.12); *G05B 2219/49008* (2013.01); *G06F 2119/18* (2020.01); *Y02P 90/265* (2015.11)

(58) Field of Classification Search
USPC .......................................................... 700/119

See application file for complete search history.

(56) References Cited

U.S. PATENT DOCUMENTS

| | | | |
|---|---|---|---|
| 2013/0242317 | A1 | 9/2013 | Leavitt et al. |
| 2014/0277665 | A1 | 9/2014 | Stump |
| 2015/0045928 | A1* | 2/2015 | Perez ................ B29C 48/02 700/110 |
| 2015/0052025 | A1* | 2/2015 | Apsley ............. G06F 17/5009 705/26.81 |
| 2015/0132425 | A1 | 5/2015 | Lacaze et al. |
| 2015/0165685 | A1 | 6/2015 | Klappert et al. |
| 2015/0174824 | A1 | 6/2015 | Gifford et al. |
| 2015/0231830 | A1 | 8/2015 | Tsai et al. |
| 2015/0242564 | A1* | 8/2015 | Chang ............. G05B 19/4099 700/118 |
| 2015/0283760 | A1 | 10/2015 | Willis |
| 2015/0328839 | A1* | 11/2015 | Willis ............. G05B 19/4099 700/98 |
| 2015/0331402 | A1* | 11/2015 | Lin ................ G06F 17/5009 700/119 |
| 2016/0059489 | A1* | 3/2016 | Wang .................. H04L 67/16 700/119 |
| 2016/0171354 | A1* | 6/2016 | Glasgow .............. G06Q 30/00 358/1.14 |
| 2016/0185044 | A1 | 6/2016 | Leonard et al. |
| 2016/0236414 | A1* | 8/2016 | Reese ................ B29C 64/386 |
| 2016/0236416 | A1* | 8/2016 | Bheda ............... B29C 64/386 |
| 2017/0072639 | A1* | 3/2017 | Levine .............. B29C 64/386 |

* cited by examiner

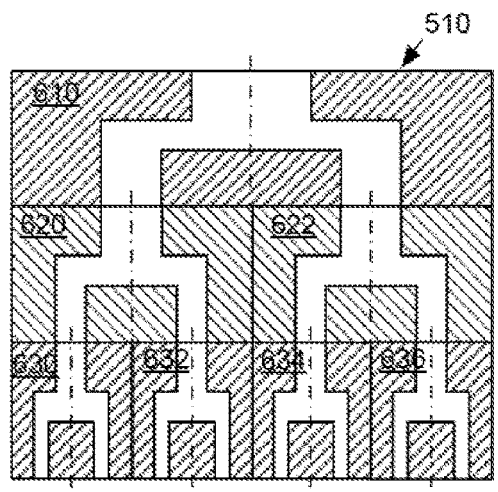
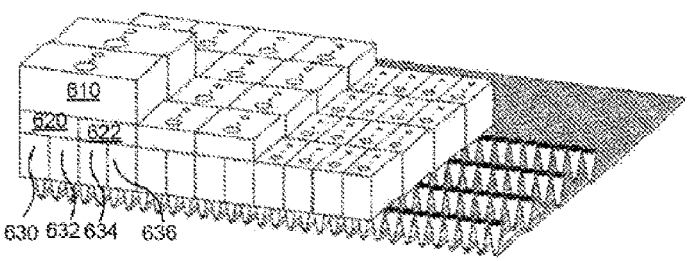
Fig. 6A　　　　　　　　　　　Fig. 6B
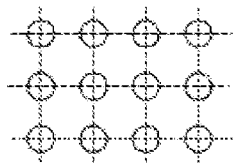
Fig. 6C
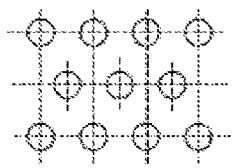
Fig. 6D
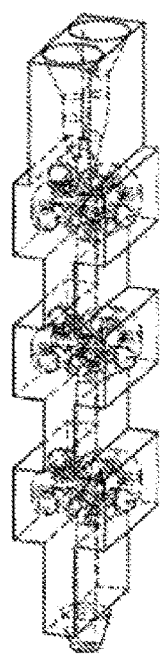
Fig. 6E
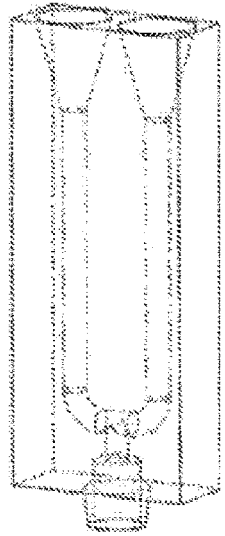
Fig. 6F This application is a filing under 35 U.S.C. § 371 of International Patent Application PCT/US2017/020759, filed Mar. 3, 2017, claims the benefit of U.S. Provisional Patent Application No. 62/303,800, filed Mar. 4, 2016, These applications are hereby incorporated by reference in their entireties.

SYSTEMS AND METHODS FOR AUTOMATED NOZZLE DESIGN AND 3D PRINTING

CROSS REFERENCE TO RELATED APPLICATIONS

This application is a filing under 35 U.S.C. § 371 of International Patent Application PCT/US2017/020759, filed Mar. 3, 2017, claims the benefit of U.S. Provisional Patent Application No. 62/303,800, filed Mar. 4, 2016, These applications are hereby incorporated by reference in their entireties.

FEDERALLY SPONSORED RESEARCH OR DEVELOPMENT

This invention was made with U.S. government support under contract number CMMI-1548261 awarded by the National Science Foundation under the EAGER program, and under a contract from the U.S. Dept. of Energy (DOE) Grant No. DE-SC0001293. The U.S. government has certain rights in the invention.

TECHNICAL FIELD

The present disclosure is related generally to three-dimensional printing. Specifically, the present disclosure is related to systems and methods for automated nozzle design and three-dimensional printing.

BACKGROUND

Three-dimensional ("3D") printing, also known as additive manufacturing, typically includes using a nozzle to deposit successive layers of a material under computer control. It encompasses a class of fabrication techniques in which structures are built in a "bottom up" mode. A 3D printer typically prints an object by depositing an ink on a substrate layer by layer. But depending on the ink/set-up, a printed object could be a complex, discrete 3D structure (e.g. open foam lattice) that is not a layer-based 3D-printed structure.

3D printing is gaining acceptance as a low-cost production method for custom-designed components. However, 3D printing remains a relatively slow process, partially because by nature a 3D product has to be printed line by line and layer by layer. To enable high throughput patterning, several techniques have been recently modified to incorporate parallelization schemes. For example, massively parallel variants of dip pen nanolithography, such as polymer pen lithography and hard-tip, soft-spring lithography, use multi-tip arrays composed of silicon or PDMS that deposit a low viscosity ink on a substrate to yield 2D nanoscale patterns. Parallel electrospinning simultaneously deposits nanofibers onto a substrate from independent and separate nozzles. These techniques, however, often requires custom designed and fabricated printing nozzle units, including micronozzles and suitable ink fluid channels.

Thus the ability to quickly design a 3D printing unit that meets a specific printing throughput pattern, and then quickly determine a print path becomes important for large scale, rapid production of planar and 3D microstructured products.

SUMMARY

Embodiments of the present disclosure provide a method, a device and a system for projection on a screen. The technical solutions are as follows:

According to an aspect of the present disclosure, a system may include a storage medium and a processor in communication with the storage medium. The storage medium may include a set of instructions for automatic design and manufacturing of 3D printing units and 3D products. When the processor executes the set of instructions, the set of instructions directs the processor to obtain specification of a target structure corresponding to a 3D product; automatically determine a design and a printing path of a 3D printing unit based on the specification of the target structure, wherein the 3D printing unit is a micronozzle unit configured to print the target structure of the 3D product; automatically determine a manufacturing procedure to print the 3D printing unit based on the specification of the target structure; and instruct a 3D printer to print the 3D printing unit according to the manufacturing procedure and the printing path of the 3D printing unit.

According to another aspect of the present disclosure, a method for automatic design and manufacturing of 3D printing units and 3D products may include obtaining, by a computer server, specification of a target structure corresponding to a 3D product; automatically determining, by the computer server, a design and a printing path of a 3D printing unit based on the specification of the target structure, wherein the 3D printing unit is a micronozzle unit configured to print the target structure of the 3D product; automatically determining, by the computer server, a manufacturing procedure to print the 3D printing unit based on the specification of the target structure; and instructing, by the computer server, a 3D printer to print the 3D printing unit according to the manufacturing procedure and the printing path of the 3D printing unit.

According to yet another aspect of the present disclosure, a non-transitory processor-readable storage medium may include a set of instructions for automatic design and manufacturing of 3D printing units and 3D products. When executed by a computer processor, the set of instructions may direct the processor to conduct actions of: obtaining specification of a target structure corresponding to a 3D product; automatically determining a design and a printing path of a 3D printing unit based on the specification of the target structure, wherein the 3D printing unit is a micronozzle unit configured to print the target structure of the 3D product; automatically determining a manufacturing procedure to print the 3D printing unit based on the specification of the target structure; and instructing a 3D printer to print the 3D printing unit according to the manufacturing procedure and the printing path of the 3D printing unit.

The terms "comprising," "including," and "having" are used interchangeably throughout this disclosure as open-ended terms to refer to the recited elements (or steps) without excluding unrecited elements (or steps).

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 6A illustrates an example of a channel module assembled by a plurality of microchannel unit;

FIG. 6B illustrates an example of 3D printing unit including a 2D micronozzle array;

FIG. 6C illustrates an array of the micronozzles in FIG. 6B according to an exemplary embodiment;

FIG. 6D illustrates an array of the micronozzles in FIG. 6B according to an exemplary embodiment;

FIG. 6E is a perspective view of an example of a switching channel unit;

FIG. 6F is a perspective view of an example of a mixing channel unit;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The present disclosure relates to systems and methods that automatically generate an ideal nozzle for fabricating a 3D product, and then using the 3D printed nozzle to generate the 3D product. The technology disclosed in the present disclosure could potentially shorten fabrication times by 6 orders of magnitude for complex geometries.

Figure 1:
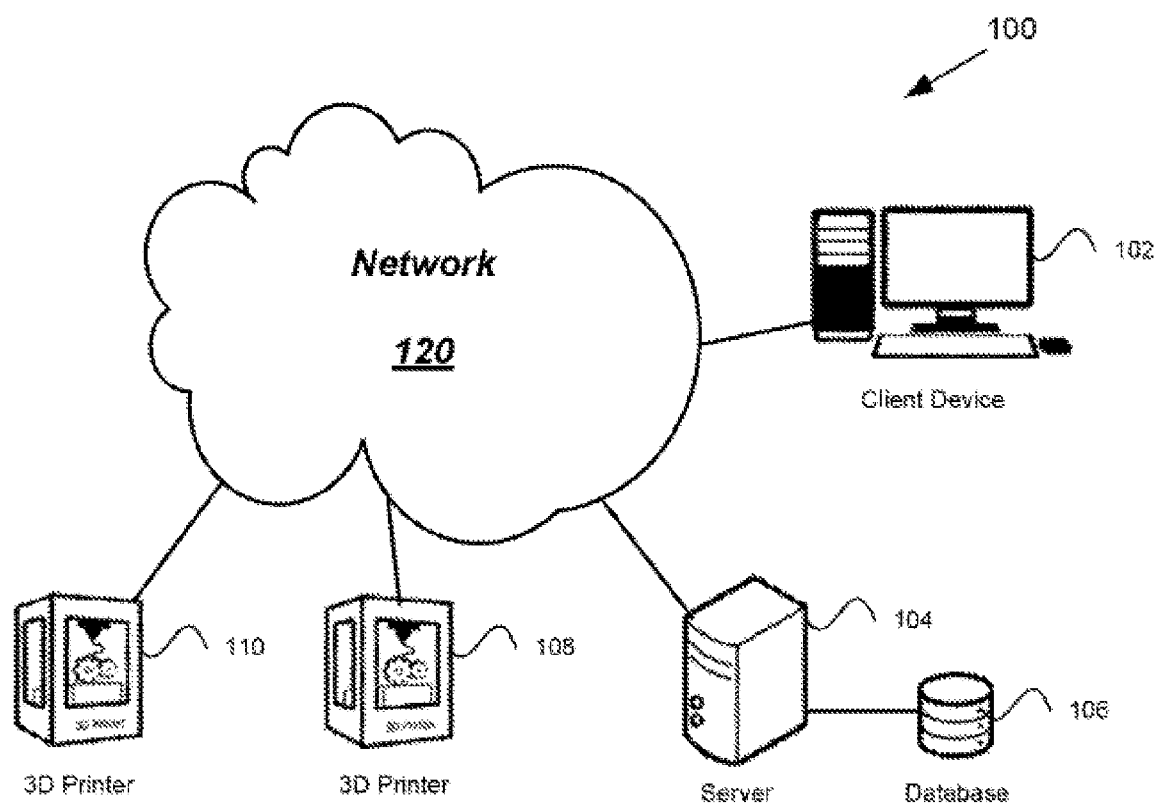
FIG. 1 is a block diagram of a system for automated nozzle design and 3D printing.

FIG. 1 is a block diagram of a system 100 for automated design and printing of a 3D printing nozzle unit. The automated nozzle design and 3D printing system 100 may include a client device 102, a server 104, a database 106, and one or more 3D printers 108, 110. These devices may be connected via wired or wireless connections 120. For illustration purpose only, the connection in the present disclosure is exemplified as a network connection 120, but one of ordinary skill in the art would understand that the connections 120 can be any type of connection capable of transmitting data communication between the above devices 102, 104, 106, 108, 110.

The client device 102 may include any data processing device that a user can input a design, such as a prototype of 3D product. The 3D product may be any product design that the 3D printer 108, 110 is capable of printing. The client device 102 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a wearable computer, an integrated device combining various features, such as features of the forgoing devices, or the like. In the example of FIG. 1, the client device 102 is depicted as a laptop computer. Further, the client device 102 may be connected to the server 104 and the 3D printers 108, 110 via the network 120, so that a user may be able to send instructions to the server 104 and the 3D printers 108, 110 via the client device 102.

The server 104 may be implemented using any suitable device capable of performing methods introduced in the present disclosure. For example, the server 104 may be implemented as a single computer server, a plurality of computer servers, or any other type of computing device known in the art. The server 104 may be a separate computer device from the client device 102. Alternatively, the server 104 may be the same device as the client device 102.

The server 104 may be in data communication with the database 106. The database 106 may include any necessary data, applications, and/or operation systems to support operations of the automated nozzle design and 3D printing system 100. For example, the database 106 may include designs and specifications of various standard and/or non-standard modules for 3D printing nozzle units, such as various designs and specifications of micronozzles, microchannels, materials, manufacturing procedures etc. The server 104 may be able to use these modules to automatically design a 3D printing nozzle unit based on the 3D product.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network such as the network 120. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

In the system 100, a user may input a design of a 3D product to the client device 102; the client device 102 may transmit the design of the 3D product to the server 104 via the wired or wireless connection 120. By accessing the database 106, the server 104 may automatically design a 3D printing nozzle unit for the 3D product, and upon the user's instruction, control the 3D printers 108, 110 to print the 3D printing nozzle unit. The user may also instruct the server 104 to print the 3D product using the 3D printing nozzle unit.

Figure 2:
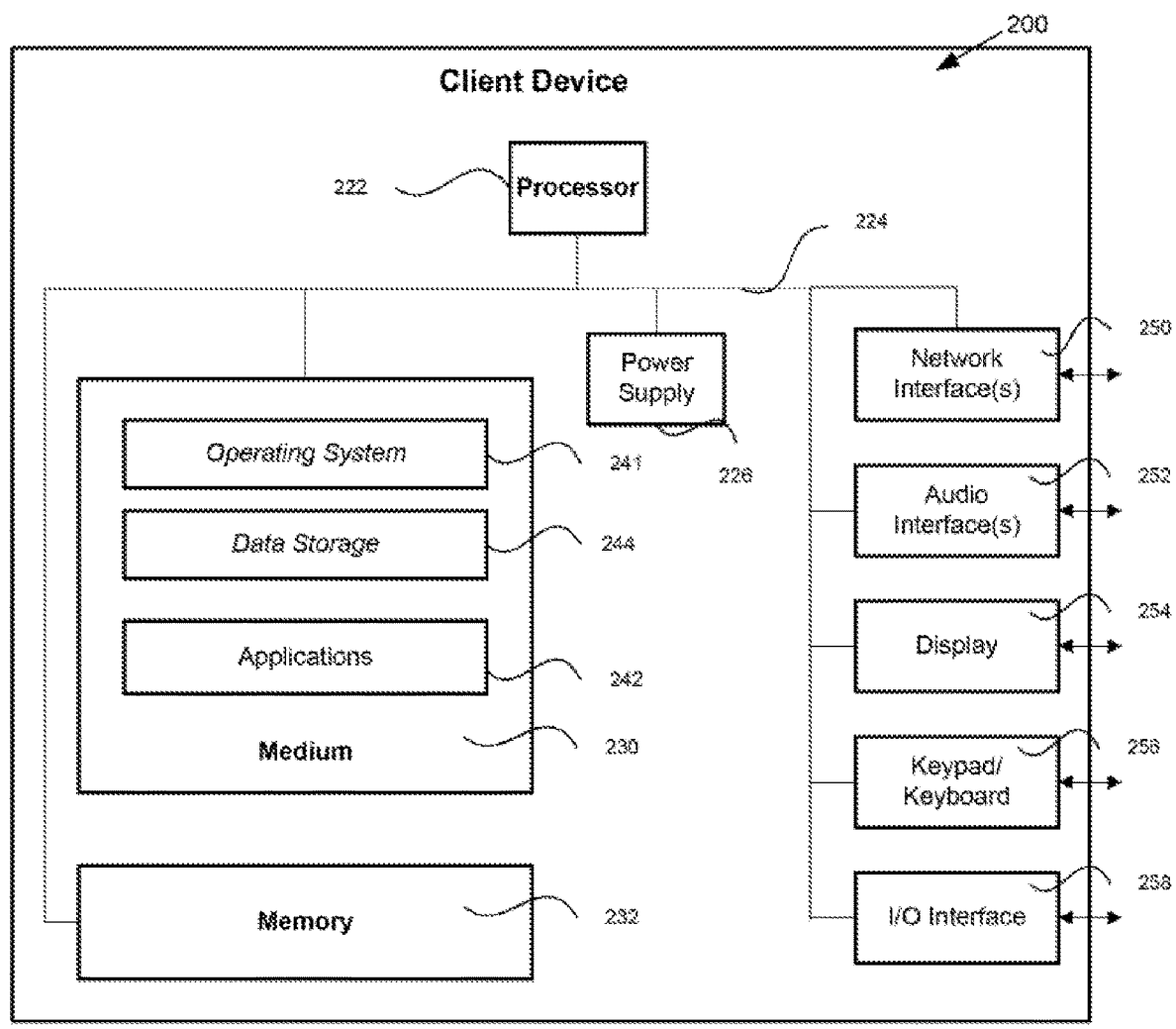
FIG. 2 is a schematic diagram illustrating an exemplary embodiment of a client device.

FIG. 2 is a schematic diagram illustrating an exemplary embodiment of a client device 200. The client device 200 may be a computer system serves as the client device 102 and capable of executing methods and software systems introduced in the present disclosure. The client device 200 may vary in terms of capabilities or features. Claimed subject matter is intended to cover a wide range of potential variations. For example, the client device 200 may include a keypad/keyboard 256. It may also include a display 254, such as a liquid crystal display (LCD), or a display with a high degree of functionality, such as a touch-sensitive color 2D or 3D display. In contrast, however, as another example, a web-enabled client device 200 may include one or more physical or virtual keyboards, and mass storage medium 230.

The client device 200 may also include or may execute a variety of operating systems 241, including an operating system, such as a Windows™ or Linux™, or a mobile operating system, such as iOS™, Android™, or Windows Mobile™. The client device 200 may include or may execute a variety of possible applications 242, such as a CAD application. An application 242 may enable communication with other devices via a network, such as communicating with the server 104 via the network 120.

Further, the client device 200 may include one or more non-transitory processor-readable storage media 230 and one or more processors 222 in communication with the non-transitory processor-readable storage media 230. For example, the non-transitory processor-readable storage media 230 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 230 may store sets of instructions, or units and/or modules that include the sets of instructions, for conducting operations and/or method steps described in the present disclosure. Alternatively, the units and/or modules may be hardware disposed in the client device 200 configured to conduct operations and/or method steps described in the present disclosure. The one or more processors may be configured to execute the sets of instructions and perform the methods and/or operations in exemplary embodiments of the present disclosure.

Figure 3:
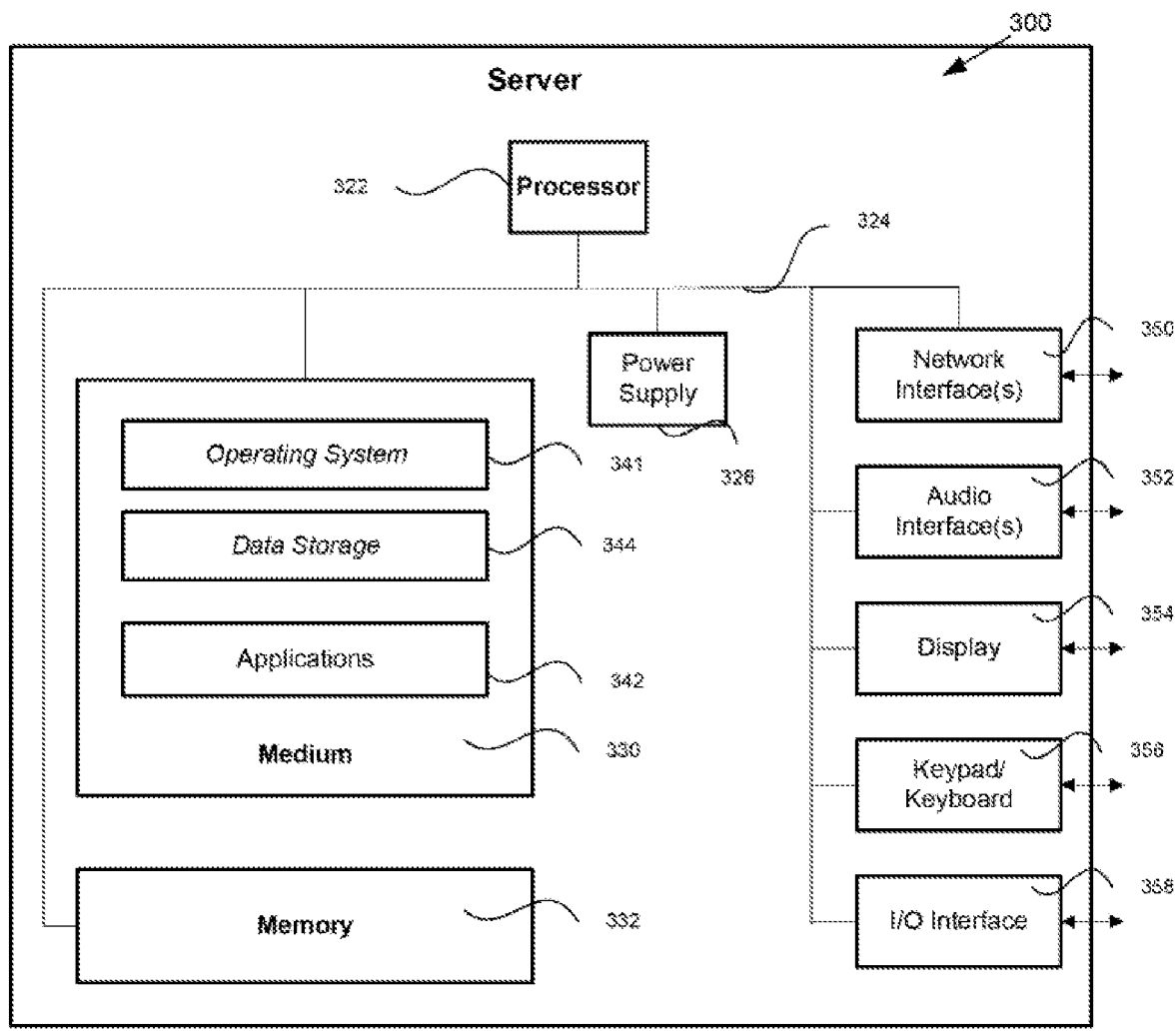
FIG. 3 is a schematic diagram illustrating an exemplary embodiment of a server.

FIG. 3 is a schematic diagram illustrating an exemplary embodiment of the server 300. The server 300 may serve as the server 104, and may vary widely in configuration or capabilities, but it may include one or more central processing units 322 and memory 332, one or more medium 330 (such as one or more transitory and/or non-transitory mass storage devices) storing application programs 342 or data 344. The processing units 322 may execute the application programs 342 or data 344 to perform methods disclosed in the present disclosure.

The server 300 may also include, one or more power supplies 326, one or more wired or wireless network interfaces 350, one or more input/output interfaces 358, and/or one or more operating systems 341, such as Windows Server™, Mac OS X™, Unix™, Linux™, FreeBSD™, or the like. Thus a server 300 may include, as examples, dedicated rack-mounted servers, desktop computers, laptop computers, set top boxes, mobile computational devices such as smart phones, integrated devices combining various features, such as two or more features of the foregoing devices, or the like.

The server 300 may further include a network interface 350 and/or I/O interface, through which the server 300 may communicate with external devices, such as a 3D printer and/or a terminal client device. The server 300 receives and execute instructions from the client device, and may send instructions to the 3D printer.

Merely for illustration, only one processor will be described in client devices and/or servers that execute operations and/or method steps in the following exemplary embodiments. However, it should be noted that the client devices and/or servers in the present disclosure may also include multiple processors, thus operations and/or method steps that are performed by one processor as described in the present disclosure may also be jointly or separately performed by the multiple processors. For example, if in the present disclosure a processor of a client device and/or server executes both step A and step B, it should be understood that step A and step B may also be performed by two different processors jointly or separately in the client device and/or server (e.g., the first processor executes step A and the second processor executes step B, or the first and second processors jointly execute steps A and B).

Figure 4:
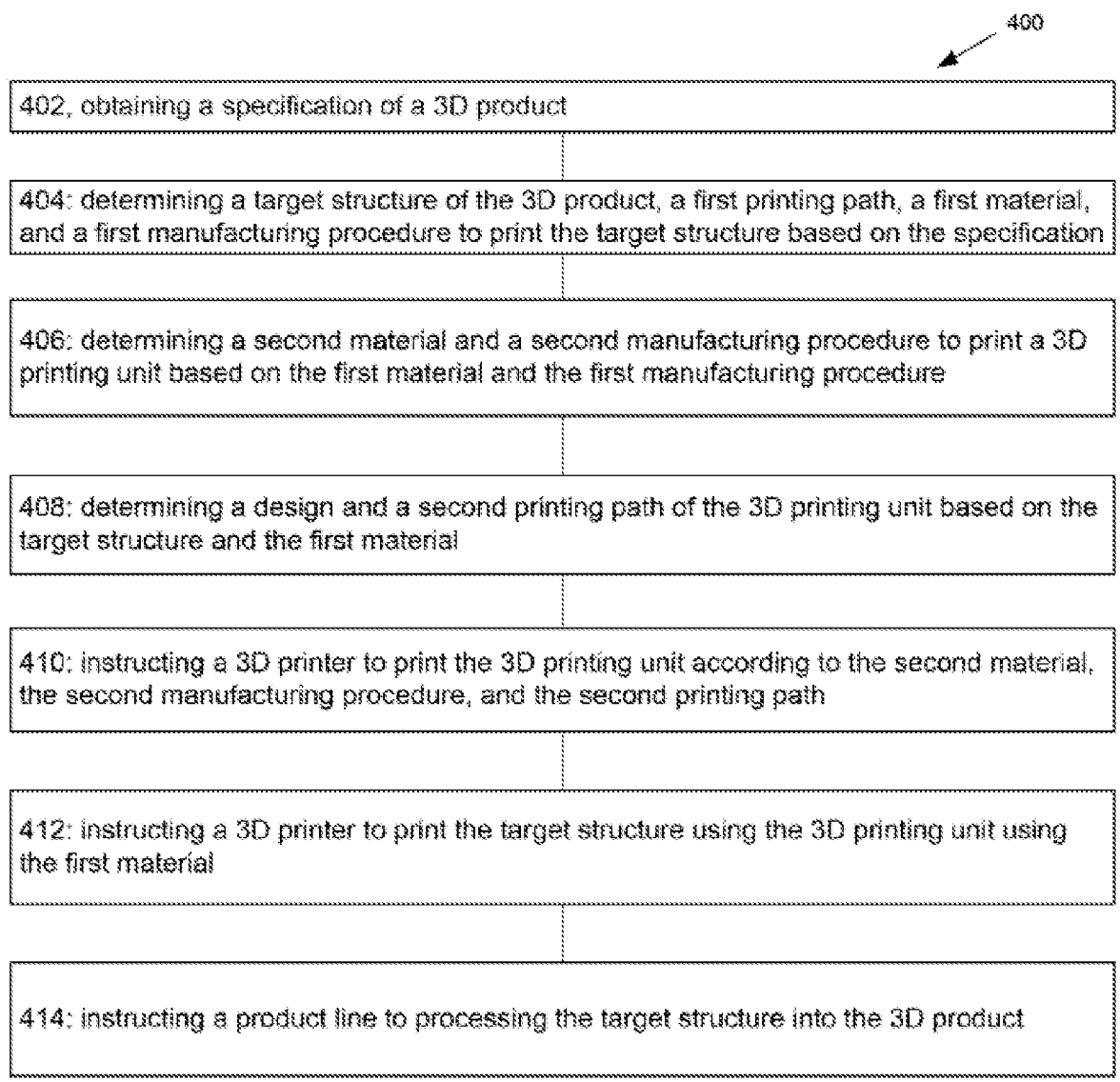
FIG. 4 is a flowchart illustrating a method for automatic design and manufacturing of 3D printing nozzle according to exemplary embodiments of the present disclosure.

FIG. 4 is a flowchart illustrating a method for automatic design and manufacturing of 3D printing nozzles according to exemplary embodiments of the present disclosure. The method may be implemented in the automated nozzle design and 3D printing system 100. For example, the method may be implemented as a set of instructions and/or an application stored in the non-transitory storage medium of the server 104. The processor of the server 104 may execute the set of instructions to perform the following actions.

Step 402: obtaining a specification of a 3D product.

The 3D product may be a prototype design concept of a product. The specification of the 3D product may include anything that defines the 3D product in engineering. For example, the specification may include descriptions of a shape and dimension of the 3D product; a shape and dimension precision requirement of the 3D product; and/or a material requirement of the 3D product.

The specification may be input by a user from the client device 102. For example, the client device 102 may have installed an application for automatically design and manufacturing of a 3D printing unit. For example, the application may be a CAD application or other application capable of assisting the user to design a 3D product. The user may operate the application to generate the specification data of the 3D product, and then send the specification data to the server 104 via the network 120. Alternatively, the application may be installed in the server 104. The user may login the server 104 from the client device 102 via the network 120 and complete designing of the 3D product directly on the server 104.

Once the specification of the 3D product is completed, the user may instruct the server 204 to automatically generate a design of a 3D printing unit suitable for printing the 3D product. The 3D printing unit may be a micronozzle unit custom designed to print the target structure of the 3D product.

Step 404: determining a target structure of the 3D product, a first printing path, a first material, and a first manufacturing procedure to print the target structure based on the specification;

Step 406: determining a second material and a second manufacturing procedure to print the 3D printing unit based on the first material and the first manufacturing procedure.

Based on the specification, the server 104 may analyze the material requirement of the 3D product and modify the structure of the 3D product in a printable form, i.e., the target structure printable by the 3D printer. example, if the 3D product is designed in such a way so that during layer by layer printing, some parts of the 3D product become suspended and have nowhere to attach, the server 104 may add a supporting structure, such as a beam or a pillar to support the suspended parts. These overhangs may be automatically detected using nearest-neighbor algorithms that iteratively calculate a supportiveness score based by selecting the maximum supportiveness score from neighboring voxels on previous or current print layers and subtracting a cost depending on the overhang angle. In particular, a voxel that has no previously printed neighbors receives a score of '0' and will require the addition of a support material, and its support score will increase to '1'. As this process relies on a convolution of a support mask which takes overhang angle costs into account, and the 3D structure, the algorithm may be rendered more computationally efficient by using Fourier analysis and multiplying the spatial Fourier transform of the structure and the support mask. By taking into account of characteristics of 3D printing, the server 104 may be able to modify the 3D product into the target structure that practically printable and obtain the specification of the target structure. For example, the specification of the target structure may include a description of the structure and content of specification of the 3D product.

Based on the target structure of the 3D product as well as its specification, the server 104 may also determine materials (i.e., the first material), manufacturing procedures (i.e., the first manufacturing procedure), and printing paths to print the target structure. For example, the 3D product may be designed to be made of silver. Based on this material requirement, the server 104 may access a material database (toolbox) stored in the database 106 and automatically select and/or determine to use a silver ink (i.e., a paste including silver particles) to print the 3D product. The material database may associate each material with one or more manufacturing procedures. Accordingly, the server 104 may be able to search the one or more manufacturing procedures associated with the silver ink and determine to adopt a real-time sintering technology to print the 3D product, where the silver ink is heated by an infrared laser beam right after flowing out of a printing nozzle. See, e.g., U.S. Application No. 62/144,706, filed Apr. 8, 2015, to Lewis, et al., which describes inline sintering of ink during printing, which is incorporated by reference herein. Specifically, the printed micronozzle may incorporate fiber optic adaptors to enable the facile addition of a fiber-optic aligned to the material being extruded from the nozzle.

To determine the optimum print path, the server 104 may implement an algorithm to minimize the total print time via both design of an optimum 3D printing multinozzle and a corresponding print path to produce the target structure. An example procedure would recognize specific structural elements, such as linear concentration gradients, or alternating material properties along a line, and would apply the use of a mixing nozzle module, or a switching nozzle module respectively to construct the shape. An example algorithm for identifying core-shell architectures would apply a concentric ring convolution mask, such as a 'mexican-hat' mask to identify regions of concentricity which are optimally printed using a core shell module. Alternatively, oscillatory regions, ideally printed using a switching nozzle, can be identified either by identification of harmonics in the spatial fourier transform, or by convolving a series of zero-sum square wave masks across the shape. After identifying the optimal series of nozzle modules on the multinozzle, the print path can be optimized by identifying the path that requires the fewest number of passes to complete the layer.

With the material and manufacturing procedure, the server 104 may further access the material database and automatically select and/or determine the material (i.e., the second material) for printing the 3D printing unit. For example, the server 104 may analyze the first manufacturing procedure and/or first printing path of the target structure based on the first material requirement. Then based on the analysis the server 104 may access the material database stored in the database 106 to select and/or determine a second material for the 3D printing unit. Using the second material, a 3D printer may print the 3D printing unit which is capable of and will be used for printing the 3D product. The server 104 may also obtain and/or determine the manufacturing procedure (i.e., the second manufacturing procedure) associated from the second material from the material database. The first and second materials may or may not be a same material. For example, the second material may be a material that is not part of the later device, such as a support material/structure for overhanging parts.

For example, because the printing nozzle will be heated during real-time sintering, the server 104 may determine and/or select a powder mixture of certain metals as the second material, and then determine and/or select to use a laser to sinter the 3D printing unit from the powder mixture of the metals.

Step 408: determining a design and a second printing path of the 3D printing unit based on the target structure and the first material.

Figure 5:
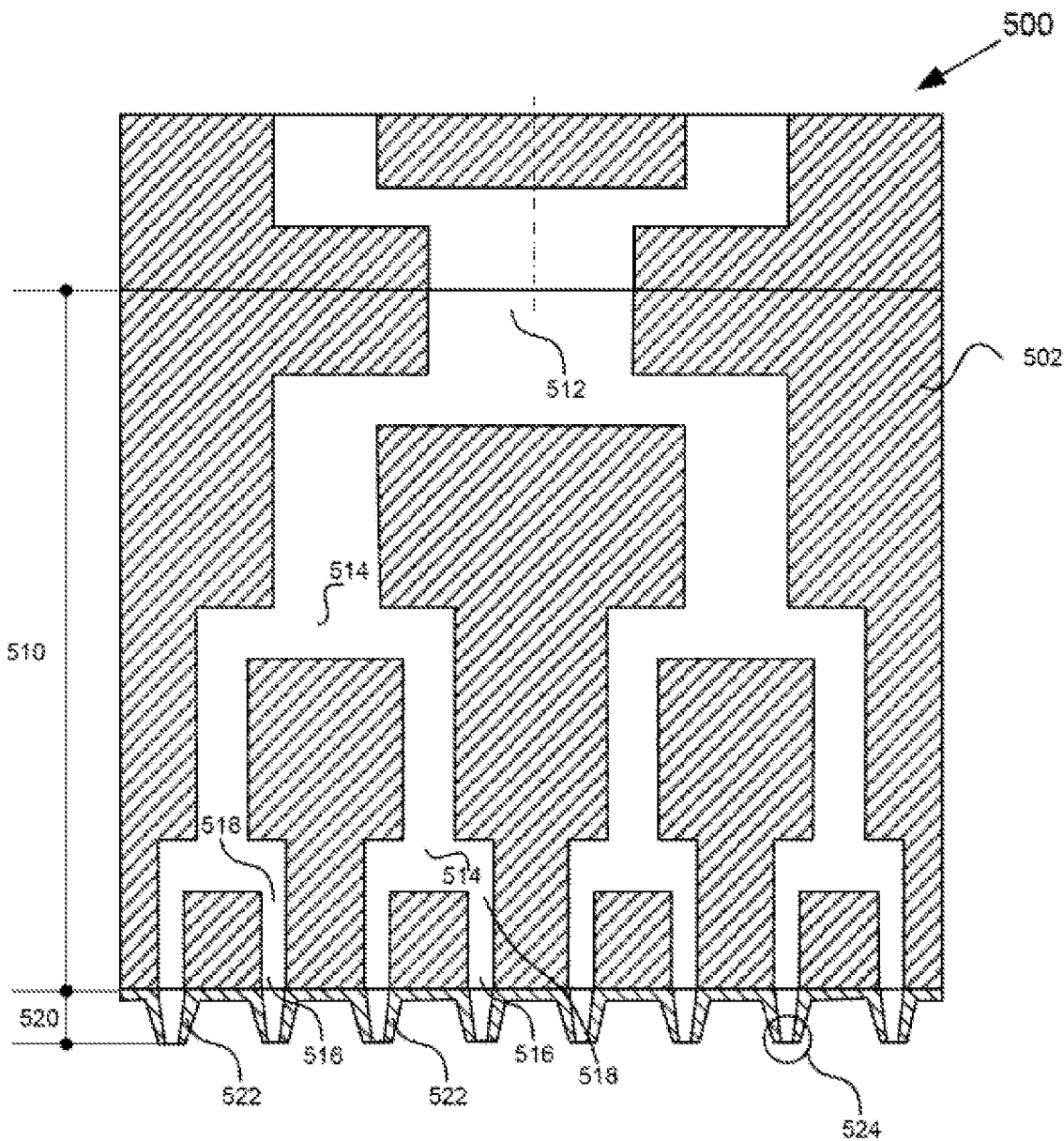
FIG. 5 illustrates an example of a 3D printing unit.

After obtaining the first material and the target structure of the 3D product, the server 104 may automatically call an automated advanced nozzle generation script in the application to determine the design of the 3D printing unit. The 3D printing unit may be a micronozzle unit custom designed to print the target structure. For example, as shown in FIG. 5, the 3D printing unit 500 may include a target channel module 510 and a target micronozzle module 520. For examples of multi-tip nozzle comprising branching microchannels, see also, US Patent Application Publication No. US 2014/0314954 A1, published Oct. 23, 2014, to Lewis et al., and Hansen, Christopher J., et al., "High Throughput Printing via Microvascular Multinozzle Arrays," Adv. Mater., 2013, 25, pp. 96-102, which are both incorporated by reference herein.

The target channel module 510 may include one or more inlets 512 for the first material to flow in, one or more outlet 516 for the first material to flow out, and one or more microchannels 518 connected therebetween. To determine the target channel module 510, the server 104 may access a database of microchannel modules (e.g., a toolbox) stored in the database 106, and determine and/or select a microchannel module capable of mixing and/or delivering first material to the micronozzle module 520.

Depending on need, microchannels in the target channel module 510 may have various functions and designs. For example, the target channel module 510 in FIG. 5 is a design to purely distribute one or more fluid into n micro-nozzles 522 in the target micronozzle module 520, wherein n is an integer greater than or equal to 2. Accordingly, the target channel module 510 may include a first surface having m inlets 512 thereon and a second surface having n outlets 516 thereon. The n outlets 516 respectively are connected to the n micro-nozzles 522. Here m is an integer smaller than n. Between the inlets and outlets is a network of microchannels connected therebetween. The network of microchannels may include a plurality of channel paths arranged in a hierarchical pattern so that each one of the n outlets on the second surface is connected to only one opening of the m inlets on the first surface with only one channel path. With the hierarchical pattern, the micro-channels may include m parent microchannels connecting to the m inlets on the first surface; n child micro-channels connecting the n outlets on the second surface; and a series of k levels of channel furcation (e.g., bifurcation) between the m parent microchannels and n child microchannels, wherein k is an integer. Each of the k levels of channel furcation includes a plurality of furcation units, and each furcation unit may include an input channel connected to a predetermined number of output channels (e.g., 2 output channels).

To determine the optimal design for the channel module, 510, the server 104 may directly find the target channel module from the toolbox in the database 106. Alternatively, the server 104 may select from the toolbox a plurality of microchannel units and assemble the plurality of microchannel units into the target channel module 510.

Figure 6G:
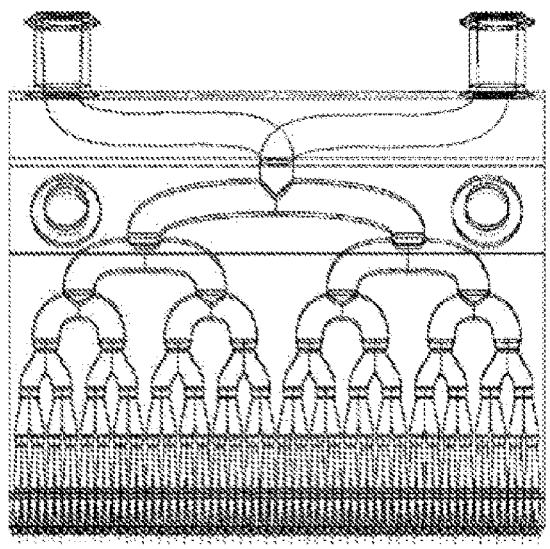
FIG. 6G illustrates a combination of channel modules according to an exemplary embodiment.

A variety of exemplary multichannel components are shown in FIGS. 6A through 6G. For example, as shown in FIG. 6A, the server 104 may select from the toolbox a design of the furcation unit, calculate and/or modify geometry parameters of the unit (sizes of the inlet and outlet as well as the furcation channel therein) for each channel level, so that inlets of each level may be properly connected to outlets of the previous level, and outlets in each level may be properly connected to inlets of the next level. An exemplary parametric coding to generate an advanced nozzle design is shown as follow:

```
Multinozzle= { 'bifurcation', ['parentDiameter', 1, 'childrenDiameter',
0.5,' childSeparation', 2],...
{'bifurcaition',['parentDiameter',0.5,'childrenDiameter',0.2]]}
{'bifurcaition',['parentDiameter',0.5,'childrenDiameter',0.2]]}
{'singleNozzle,['parentDiameter...}
}
```

The hierarchical structure of the microchannels may be arranged within a plane, so that micronozzles connected to the outlets are aligned along a line. Alternatively, the hierarchical structure of the microchannels may be arranged in a 3 dimensional manner, such as FIG. 6B, so that the micronozzles connected to the outlets of the target channel module may be arranged as a 2D array to increase printing efficiency. For example, the 2D array may be x=64, y=4, meaning that there are 64 micronozzles in the x direction and 4 micronozzles in the y direction. The size of the micronozzles may be the same or may be different. For example, the server 104 may determine that a first row along x direction of the 2D array may be 200 μm micronozzles and the second row along x direction of the 2D array may be 400 μm micronozzles. In this scenario, the server 104 may modify the geometry parameters of the microchannel units so that the micronozzles in the array are aligned to fit in a grid, as shown in FIG. 6C. Alternatively, the server 104 may modify the geometry parameters of the microchannel units so that the micronozzles in 2 adjacent rows in the array are aligned with an offset, as show in FIG. 6D.

In addition to the furcation module, the server 104 may select other types of channel units from the toolbox depending on the need. For example, the server 104 may also select one or more switching channel units (FIG. 6E) and/or one or more mixing channel units (FIG. 6F), and then modify the geometry parameters of these units so that the microchannels therein fit into the channel network in the target channel module 510.

The switching channel unit in FIG. 6E may include channels and/or a switching nozzle configured to bring together two or more material streams. For example, the stream may be from an x=64, y=2 main module. Pressure driven flows can be used if the upstream fluid resistance is very high compared with the resistance of the nozzle after the two streams are brought together. For an example of the switching nozzle, see Hardin, J O, T J Ober, A D Valentine, and J A Lewis. 2015. "Microfluidic Printheads for Multimaterial 3D Printing of Viscoelastic Inks." Advanced Materials 27: 3279-3284, which is incorporated by reference herein.

The mixing channel unit in FIG. 6F may include channels and/or a nozzle configured to mixing two or more materials. For example, the mixing channel unit may be connected to an x=64, y>1 main module. The mixing can be performed by any microfluidic mixing method. FIG. 6F shows a four-way baker transform mixer. Note that the mixer is designed to fit adjacent to a second offset mixer for maximally efficient space utilization.

The server 104 may also combine different channel units into the target channel module 510. For example, the server 104 may combine the switching channel unit in FIG. 6E or the mixing channel unit in FIG. 6F and place it on top of the assembled furcation units in FIG. 6A to form a combined channel unit as shown in FIG. 6G. Alternatively, FIG. 6G may also be a combination of an upside-down furcation unit and the assembled furcation units in FIG. 6A.

After the server 104 has determined the desired configuration of the micronozzle, the module architecture may be described as outlined in conjunction with FIG. 6A and interpreted by C#/C++ or VB to generate .stl renderings of the individual models. The .stl modules then may be compiled, either using Solidworks API to couple the C#/C++ or VB outputs to Solidworks functions such as surface mating and Boolean combination C++/VB to automatically assemble the multiple components into a single whole multinozzle part for printing. Alternatively, the .stl files for each module, each comprising rows of triangle vertices for the triangular mesh, may simply be appended into a single large file, with origin offsets applied to each module to ensure correct relative positioning of all modules into the whole multi-nozzle.

The specification of the microchannels 518 may require a 3D printer to print at certain resolution. Depending on factors such as the specification of the 3D product and the material properties (e.g., viscosity etc.) of the first material that flows through the microchannels, the size of the outlets 516 may be large or small. For example, if the 3D product or the target structure requires a finer surface or higher shape accuracy, the micronozzles that print the 3D product or the target structure may be of smaller size. Accordingly, the outlets 516 may be of smaller size to properly connect to the micronozzles. If the first material that flows out of the outlets 516 has low viscosity, the diameter of the outlet 516 may be designed small, as well. As a result, printing the target channel module 510 may require printing nozzles of higher resolution and thus longer time to print and/or manufacture. Conversely, if the 3D product has lower accuracy and/or surface smoothness requirement, and/or if the first material has high viscosity, the server 104 may select larger micronozzles to print the 3D product in order to achieve a higher printing speed. Therefore, the server may determine that the outlets 516 of the channel may be of larger size, so that the target channel module 510 may be printed by a larger micronozzle using shorter time. The server 104 may determine a first resolution as a threshold value and require that the target channel module 510 be printed by at a resolution higher than or equal to the first resolution.

The target micronozzle module 520 may include one or more micronozzle ports 522 respectively connected to the one or more outlets 516. To determine the one or more micronozzle ports 522, the server 104 may access a database of micronozzles (e.g., a toolbox) stored in the database 106, and determine and/or select the one or more micronozzle ports 522 capable of mixing and/or delivering the first material and print the target structure at a required quality, shape, and speed etc.

Figure 7A:
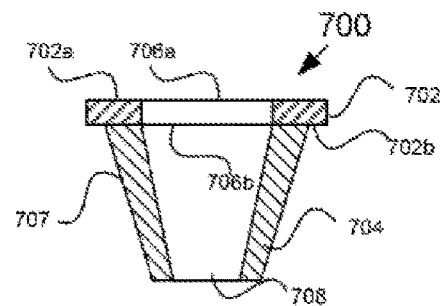
FIG. 7A illustrates a basic micronozzle unit.
Figure 7B:
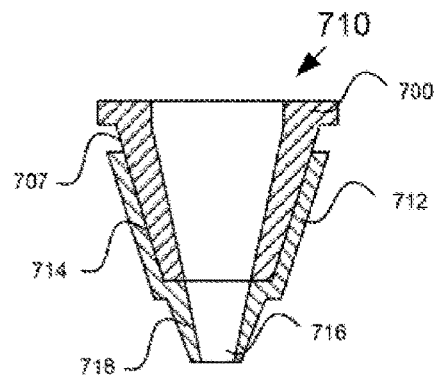
FIG. 7B illustrates a micronozzle unit with a high resolution port.
Figure 7C:
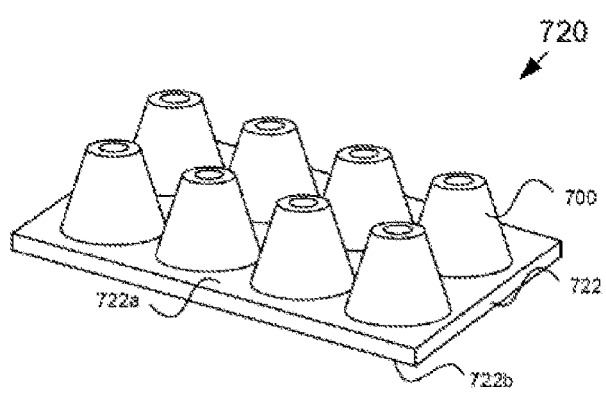
FIG. 7C illustrates a micronozzle unit with a micronozzle array.

A variety of exemplary multichannel components are shown in FIGS. 7A through 7C. FIG. 7A illustrates the structure of a basic micronozzle 700. The micronozzle may include an adaptor body 702 and a micronozzle cone 704. The adaptor may be a plate, a cuboid, or any other shape that includes a first surface 702a and a second surface 702b on the opposite side of the first surface 702a. In FIG. 7A, the first surface 702a and the second surface 702b are parallel planes. Alternatively, in other exemplary embodiments, the first surface 702a and the second surface 702b may be of nonlinear shape and may be un-parallel with respect to each other. The adaptor body 702 may also include a microchannel connecting between the first surface 702a and the second surface 702b, forming an inlet 706a on the first surface and an outlet 706b on the second surface 702b. The micronozzle cone 704 may be attached to the second surface 702b and connected with the outlet 706b. The micronozzle cone 704 may have a cone shape outer surface 707 and a microchannel therein. The microchannel in the micronozzle cone 704 may form an outlet 708 on a bottom surface of the micronozzle cone 704.

FIG. 7B. illustrates a micronozzle 710 that includes a high resolution port 712 attached to a low resolution nozzle body. The high resolution port 712 requires a higher resolution 3D printer to print than the low resolution body. In FIG. 7B, the low resolution nozzle body is the basic micronozzle 700 and the high resolution port 712 is an adaptor cup. The adaptor cup 712 may have an inner surface 714 and an outer surface. The inner surface may match and is connected to the outer surface 707 of the basic micronozzle 700. Further, the adaptor cup 712 may include a microchannel 716 matching and connected to the outlet 708 of the basic micronozzle 700.

FIG. 7C illustrates a unit of micronozzle array 720 according to an exemplary embodiment of the present disclosure. The unit 720 may include a plurality of the basic micronozzles 700. For example, the unit 720 may include an adaptor body 722 having a first surface 722a, a second surface 722b, and n microchannels connecting between the first surface 722a and second surface 722b, wherein n is an integer greater or equal to 2. The n microchannels are arranged as an array in the adaptor body. The arrangement of the array may be corresponding to the outlets 516 in the target microchannel module 510. Further, each outlet of the n microchannels may be connected to a micronozzle tip. The micronozzle tip may be of the similar structure as shown in FIG. 7A or FIG. 7B.

Figure 7D:
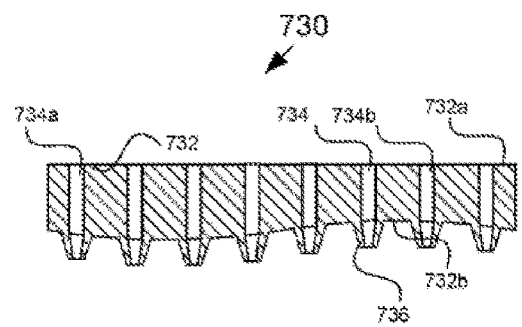
FIG. 7D illustrates a micronozzle unit with a micronozzle array having a nonlinear contour.

FIG. 7D illustrates a unit of micronozzle array 730 with nonlinear contour. The unit 730 may include an adaptor body 732 having a first surface 732a, a second surface 732b un-parallel to the first surface, and n microchannels 734 connecting between the first surface 732a and second surface 732b, wherein n is an integer greater or equal to 2. The unit 730 may also include n micronozzles 736 on the second surface 732b, respectfully connected to the n microchannels 734. For example, the n micronozzles may be the basic micronozzle 700. Alternatively, the n micronozzles 736 may also be other type of micronozzles or a combination of different types of micronozzles. The second surface 732b may comprise a nonlinear shape and/or may be a non-flat surface. For example, the second surface 732b may be described by a mathematical equation. Examples of the mathematical equation may be, but are not limited to, sinusoidal function, hyperbolic function, elliptical function, or square wave function. Accordingly, a contour of the tips of the n micronozzles may follow the shape of the second surface 732b. The shape of the second surface 732b may be predetermined based on a shape of a surface on the 3D product that the unit 730 will be used to print.

Because the first surface 732a and the second surface 732b are not parallel with each other, the microchannels 734 may not be of the same length. For example, because of the wavy shape of the second surface 732b as shown in FIG. 7D, the microchannel 734a is longer than the microchannel 734b. For two channels that has the same effective cross sections areas (such as when the two channels have the same diameter), the longer channel has higher resistance to a viscous fluid than the shorter channel. In order for the fluid to have a same resistance when flowing through any of the n microchannels of different length, each of the n microchannels may have a predetermined effective cross section area. the server 104 may determine the effective cross section area of a microchannel (e.g., by determining the diameter of the microchannel) based on its length and viscosity of the fluid that is designed to flow through the channel. The longer the microchannel, the larger the effective cross section area; and the higher the viscosity, the larger the effective cross section area. As a result, when the fluid flows through the n microchannels with a same fluid pressure on the first surface, the fluid flows out from the n micronozzles at a same flow rate and/or pressure.

Similar to the target channel module 510, the size and resolution requirement of the target micronozzle module 520 may vary depending on factors such as the specification of the 3D product and the material properties (e.g., viscosity etc.) of the first material to flow out of the micronozzles. For example, if the 3D product requires a finer surface or higher shape accuracy, the micronozzles that print the 3D product may be of smaller size. Accordingly, the one or more micronozzle ports 522 may be of smaller size. If the first material that flows out of the outlets 516 has low viscosity, the diameter of the one or more micronozzles may be designed small as well. As a result, printing the target micronozzle module 520 may require a higher printing resolution and longer time to print and/or manufacture. Conversely, if the 3D product has lower accuracy and/or surface smoothness requirement, and/or if the first material has high viscosity, larger micronozzles may be adopted for printing the 3D product. Therefore, the server 104 may determine to print the one or more micronozzle ports 522 with a lower resolution printer to print quickly. The server 104 may determine a second resolution as a threshold value and require that the micronozzle ports 522 be printed by at a resolution higher than the second resolution. Normally, the resolution requirement of the micronozzle ports 522 may be higher than or equal to the resolution requirement of the microchannels 518. Accordingly, the second resolution may be higher than the first resolution. Note that the second printing path for different resolution may be different.

Alternatively, to further increase the printing speed of the 3D printing unit 500, the server 104 may further determine to print only a tip portion 524 of the micronozzle ports 522 under a resolution higher than or equal to the second resolution, the remainder of the target micronozzle module 520 and the entire target channel module 510 may be printed under a resolution lower than the second resolution and higher or equal to the first resolution.

For example, the server 104 may select from the micronozzle database a micronozzle 710 with a high resolution port 718 such as a micronozzle tip, as shown in FIG. 7B. The high resolution port 712 may be printed together with the nozzle body 700 under different resolutions, or may be printed separately and assembled with an adaptor cup 712 that is assembled to the low resolution body 700. To print the micronozzle tip 718, a stereolithography (SLA) printer with a 42 micron resolution and a 45 mm×60 mm×100 mm build volume may be used to print the micronozzle body 700. The high resolution port 718 and the adaptor cup 712 may be printed via a multi-photon photolithography (MPP) using a Nanoscribe printer. The adaptor assembly may be formed by applying a thin coating of uncured acrylate resin to a bottom surface of the SLA printed output nozzle body 700; pushing the SLA printed output nozzle body into the nanoscribe printed adaptor cup 718; and exposing the interface to light to cure the two components together, creating a tight seal.

After selecting the target channel module 510 and the target micronozzle module 520, the server 104 may combine the two modules together and save an assembly that includes the two modules as one part. To this end, the server may parameterize the design, both in the part and assembly level, allowing the target channel module 510 and the target micronozzle module 520 to globally set the dimensions and relations. The parametrization may provide full control of the design process, on both the part and assembly level, through external programming (e.g. VB or C#). Hence, the design process may be fully automated without a need to manually operate the application (e.g., CAD application). This also allows implementing design rules and manufacturing constraints that exist in the nozzle manufacturing process (e.g., what overhangs can be printed without the requirement for support material? What are the minimum printable outlet port I.D. sizes and wall thicknesses? Etc.) The result of the 3D printing unit design may be saved under a format that can be read into a 3D printer (software), such as an STL (stereolithographic) file.

Referring again to FIG. 4, step 410: instructing a 3D printer to print the 3D printing unit according to the second material, the second manufacturing procedure, and the second printing path.

The server 104 may send the second manufacturing procedure, the second material, and the second printing path to the 3D printer 108, 110 and instruct the 3D printer 108 to print the 3D printing unit according to the second printing path and the second material. For example, the server 104 may instruct the 3D printer 108, 110 to use a high power laser to sinter the 3D printing unit layer by layer from the power of the alloy.

In the event that the second resolution is greater than the first resolution, the server 104 may first send the specification of the micronozzle module 510 or the tip portion 524 of the micronozzles 522 to the 3D printer 108, which may be an ultrahigh resolution printer (e.g., a Nanoscribe printer which has a much higher resolution than ordinary printer in the market) to print the micronozzles 522 or the tip portion 524 at a predetermine resolution equals to or higher than the second resolution. Then the printed micronozzles 522 or the tip portion 524 may be sent to the 3D printer 110 (e.g., a stereolithographic printer), which may be of a lower resolution. Alternatively, the server 104 may instruct the 3D printer 108, 110 to print the remainder low resolution portion first and then print the ultrahigh resolution portion. Alternatively, the ultrahigh resolution portion and the remainder low resolution portion of the 3D printing unit may be printed separately, and then be semi-automatically attached to each other.

The printed micronozzles 522 or the tip portion 524 may be sent to the 3D printer 110 via a transmission belt, a robot, or manually by a user. Alternatively, the 3D printer 110 may be the same 3D printer 108. The server 104 may then instruct the 3D printer 110 to print the remainder portion of the 3D printing unit at a predetermined resolution equals or higher than the first resolution but lower than the second resolution.

In order to increase efficiency and reduce error, the server 104 may conduct the following post-processing of the STL file, for example, through a STL Editor software (e.g. Materialize Magics). The server 104 may first fix errors in the STL file that are often created through, for example, triangulation of solid parts into surface-like structures; rotate the target structure to: i) minimize printing time, and/or ii) optimize the print quality and printability. Most printers have different print resolution in different planes, e.g., a higher resolution in the XY-plane, which is the plane of the layers orthogonal to the print head movement. Also, the rotation may also adjust the printability of the target structure, for example, overhangs without the need for support material. Further, the server may also instruct the 3D printer to translate the target structure to a reference point of the printer, to let the printer know where in the three-dimensional space the target structure sits.

In the above exemplary embodiment, the system 100 and/or the server 104 adopts a bi-resolution method to divide the 3D printing unit in 2 portions. The system 100 and/or the server 104 prints the first portion (e.g., the micronozzles) of the 3D printing unit slowly but with higher resolution, and print the second portion of the 3D printing unit fast with a lower resolution. One of ordinary skill in the art should understand that the system 100 and/or the server 104 may divide the 3D printing unit into any number of portions and assign the portions with different resolutions. With the same printing method and depending on need, the system 100 and/or the server 104 may be able to print the 3D printing unit with various resolutions. With this method, the system 100 and/or the server 104 may be able to print a target 3D printing unit at much higher speed while meets the resolution requirement of the micronozzles in the 3D printing unit.

The above-described is one possible fabrication process to manufacture a multi nozzle. The described process has been successfully tested for the direct ink-writing method, but the nozzle design can also be used in other processes such as fused deposition modelling (FDM).

For each printing-process in which the multi-nozzle is intended to be used, the nozzle fabrication process may need to be reconsidered and potentially adjusted. For FDM, for example, the multi-nozzle may need to be made from a material of higher heat resistance, such as metal. Appropriate and feasible metal manufacturing processes may include, but are not limited to, metal 3D-printing, such as selective laser melting, and casting, such as investment casting.

Referring again to FIG. 4, step 412: instructing a 3D printer to print the target structure using the 3D printing unit using the first material.

Finally, the 3D printing unit may be installed in the 3D printer 108, 110, either manually or by a machine, and the server 104 may instruct the 3D printer to print the target structure of the 3D product based on the first printing path and using the first material. For example, the 3D printer 108, 110 may inject the silver ink to the inlet 512 and eject the silver ink from the micronozzles 522 and sinter the silver paste layer by layer to generate the silver target structure.

Step 414: instructing a product line to processing the target structure into the 3D product.

The server 104 may further instruct a product line, such as a trimming machine or a robot, to process the target structure, such as cutting off the supporting structure, such as the beam or the pillar, from the target structure, and generate the 3D product.

Although the present disclosure has been described in considerable detail with reference to certain embodiments thereof, other embodiments are possible without departing from the present disclosure. The spirit and scope of the appended claims should not be limited, therefore, to the description of the preferred embodiments contained herein. All embodiments that come within the meaning of the claims, either literally or by equivalence, are intended to be embraced therein. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

We claim:

1. A system, comprising:
   a non-transitory processor-readable storage medium, comprising a set of instructions for automatic design and manufacture of 3D printing units and 3D products; and
   a processor in communication with the non-transitory processor-readable storage medium, wherein when executing the set of instructions, the processor conducts actions to:
      obtain specification of a target structure corresponding to a 3D product;
      automatically determine a design and a printing path of a 3D printing unit based on the specification of the target structure, wherein the 3D printing unit is a micronozzle unit configured to print the target structure of the 3D product
      automatically determine a manufacturing procedure to print the 3D printing unit based on the specification of the target structure; and
      instruct a 3D printer to print the 3D printing unit according to the manufacturing procedure and the printing path of the 3D printing unit,
   wherein the 3D printing unit comprises:
      a target micronozzle module comprising n micronozzles, wherein n is an integer greater or equal to 2; and
      a target channel module comprising:
         a first surface having m openings thereon, wherein m is an integer smaller than n;
         a second surface having n openings thereon respectively connected to the n micro-nozzles; and
         a network of microchannels, connecting the m openings on the first surface and the n openings on the second surface.

2. The system of claim 1, wherein to obtain the specification of the target structure, the processor further conducts actions to:
   obtain a design of the 3D product; and
   modify a structure of the 3D product in a printable form as the target structure.

3. The system of claim 1, wherein the specification of the target structure comprises at least one of:
   a description of the target structure;
   a printing path of the target structure;
   a material to print the target structure; and
   a manufacturing procedure to print the target structure.

4. The system of claim 1, wherein the processor further conducts actions to: instruct a 3D printer to print the target structure using the 3D printing unit.

5. The system of claim 1, wherein the network of microchannels comprises:
   a first plurality of parent microchannel modules connecting the m openings on the first surface;
   a second plurality of child microchannel modules connecting the n openings on the second surface; and
   a series of k levels of microchannel modules between the first plurality of parent microchannel modules and the second plurality of child microchannel modules, wherein k is an integer.

6. The system of claim 5, where to determine the design of the 3D printing unit, the processor conducts actions to
   select, from a database of micronozzle designs, the target micronozzle module suitable of printing the 3D product; and
   select, from a database of microchannel modules designs, a plurality of microchannel modules, including the first plurality of parent microchannel modules, the second plurality of child microchannel modules, and microchannel modules of the k levels of microchannel modules;
   determine dimension of each of the plurality of the microchannel modules; and
   assemble the plurality of microchannel modules at the determined dimensions so that inlets of each level are properly connected to outlets of a previous level, and outlets in each level are properly connected to inlets of the next level.

7. The system of claim 1, wherein the manufacturing procedure to print the 3D printing unit comprises:
   printing at least a first portion of the target micronozzle module at a first predetermined resolution; and
   printing a remainder portion of the 3D printing unit at a second predetermined resolution lower than the first predetermined resolution.

8. The system of claim 7, wherein the manufacturing procedure to print the 3D printing unit further comprises:
   applying a thin coating of adhesive to a bottom surface of the remainder portion;
   pushing the bottom surface of the remainder portion into the first portion; and
   gluing the first portion and the remainder portion to create a tight seal therebetween.

9. The system of claim 8, wherein the glue is an uncured acrylate resin; and
   the gluing of the first portion and the remainder portion comprises exposing an interface between the first portion and the remainder portion to light to cure the acrylate resin.

10. A method for automatic design and manufacturing of 3D printing units and 3D products, comprising:

obtaining, by a computer server, specification of a target structure corresponding to a 3D product;

automatically determining, by the computer server, a design and a printing path of a 3D printing unit based on the specification of the target structure, wherein the 3D printing unit is a micronozzle unit configured to print the target structure of the 3D product;

automatically determining, by the computer server, a manufacturing procedure to print the 3D printing unit based on the specification of the target structure; and instructing, by the computer server, a 3D printer to print the 3D printing unit according to the manufacturing procedure and the printing path of the 3D printing unit, wherein the manufacturing procedure to print the 3D printing unit comprises:
printing at least a first portion of a target micronozzle module at a first predetermined resolution; and
printing a remainder portion of the 3D printing unit at a second predetermined resolution lower than the first predetermined resolution.

11. The method of claim 10, wherein the obtaining of the specification of the target structure comprises:
obtaining, by the computer server, a design of the 3D product; and
modifying, by the computer server, a structure of the 3D product in a printable form as the target structure.

12. The method of claim 10, wherein the specification of the target structure comprises at least one of:
a description of the target structure;
a printing path of the target structure;
a material to print the target structure; and
a manufacturing procedure to print the target structure.

13. The method of claim 10, further comprising:
instructing, by the computer server, a 3D printer to print the target structure using the 3D printing unit.

14. The method of claim 10, wherein the 3D printing unit comprises:
a target micronozzle module comprising n micro-nozzles, wherein n is an integer greater or equal to 2; and
a target channel module comprising:
a first surface having m openings thereon, wherein m is an integer smaller than n;
a second surface having n openings thereon respectively connected to the n micro-nozzles; and
a network of microchannels, connecting the m openings on the first surface and the n openings on the second surface.

15. The method of claim 14, wherein the network of microchannels comprises:
a first plurality of parent microchannel modules connecting the m openings on the first surface;
a second plurality of child microchannel modules connecting the n openings on the second surface; and
a series of k levels of microchannel modules between the first plurality of parent microchannel modules and the second plurality of child microchannel modules, wherein k is an integer.

16. The method of claim 15, where the determining of the design of the 3D printing unit comprises:
selecting, from a database of micronozzle designs, the target micronozzle module suitable of printing the 3D product; and
selecting, from a database of microchannel modules designs, a plurality of microchannel modules, including the first plurality of parent microchannel modules, the second plurality of child microchannel modules, and microchannel modules of the k levels of microchannel modules;
determining dimension of each of the plurality of the microchannel modules; and
assembling the plurality of microchannel modules at the determined dimensions so that inlets of each level are properly connected to outlets of a previous level, and outlets in each level are properly connected to inlets of the next level.

17. The method of claim 10, wherein the manufacturing procedure to print the 3D printing unit further comprises:
applying a thin coating of adhesive to a bottom surface of the remainder portion;
pushing the bottom surface of the remainder portion into the first portion; and
gluing the first portion and the remainder portion to create a tight seal therebetween.

18. The method of claim 17, wherein the glue is an uncured acrylate resin; and
the gluing of the first portion and the remainder portion comprises exposing an interface between the first portion and the remainder portion to light to cure the acrylate resin.

19. A system, comprising:
a non-transitory processor-readable storage medium, comprising a set of instructions for automatic design and manufacture of 3D printing units and 3D products; and
a processor in communication with the non-transitory processor-readable storage medium, wherein when executing the set of instructions, the processor conducts actions to:
obtain specification of a target structure corresponding to a 3D product;
automatically determine a design and a printing path of a 3D printing unit based on the specification of the target structure, wherein the 3D printing unit is a micronozzle unit configured to print the target structure of the 3D product;
automatically determine a manufacturing procedure to print the 3D printing unit based on the specification of the target structure; and
instruct a 3D printer to print the 3D printing unit according to the manufacturing procedure and the printing path of the 3D printing unit,
wherein the manufacturing procedure to print the 3D printing unit comprises:
printing at least a first portion of a target micronozzle module at a first predetermined resolution; and
printing a remainder portion of the 3D printing unit at a second predetermined resolution lower than the first predetermined resolution.

20. The system of claim 19, wherein the manufacturing procedure to print the 3D printing unit further comprises:
applying a thin coating of adhesive to a bottom surface of the remainder portion;
pushing the bottom surface of the remainder portion into the first portion; and
gluing the first portion and the remainder portion to create a tight seal therebetween.

* * * * *

UNITED STATES PATENT AND TRADEMARK OFFICE
CERTIFICATE OF CORRECTION

PATENT NO. : 10,946,588 B2
APPLICATION NO. : 16/081812
DATED : March 16, 2021
INVENTOR(S) : Jennifer Lewis et al.

It is certified that error appears in the above-identified patent and that said Letters Patent is hereby corrected as shown below:

On the Title Page

Item [73], delete:
"President and Fellows of Harvard University"
And insert:
-- President and Fellows of Harvard College --

Signed and Sealed this
Fourth Day of July, 2023

Katherine Kelly Vidal
*Director of the United States Patent and Trademark Office*